(12) United States Patent
Wang et al.

(10) Patent No.: US 7,894,103 B2
(45) Date of Patent: *Feb. 22, 2011

(54) VARIABLE DATA DIGITAL PANTOGRAPHS

(75) Inventors: Shen-Ge Wang, Fairport, NY (US); Reiner Eschbach, Webster, NY (US); Peter Stanley Fisher, Pasadena, CA (US)

(73) Assignee: Xerox Corporation, Norwalk, CT (US)

( * ) Notice: Subject to any disclaimer, the term of this patent is extended or adjusted under 35 U.S.C. 154(b) by 537 days.

This patent is subject to a terminal disclaimer.

(21) Appl. No.: 12/034,141

(22) Filed: Feb. 20, 2008

(65) Prior Publication Data

US 2009/0207433 A1 Aug. 20, 2009

(51) Int. Cl.
*G06K 15/02* (2006.01)
*B41M 3/14* (2006.01)

(52) U.S. Cl. .................. 358/3.28; 358/1.11; 358/1.14; 283/902

(58) Field of Classification Search ............... 358/1.9, 358/3.28, 1.11, 1.14, 1.18; 283/72, 85, 93, 283/94, 58, 113, 902; 356/71; 382/100, 382/135, 137, 173, 174, 176, 177, 190, 191; 347/107

See application file for complete search history.

(56) References Cited

U.S. PATENT DOCUMENTS

| | | | |
|---|---|---|---|
| 4,168,088 A | 9/1979 | Somlyody | |
| 4,175,774 A | 11/1979 | Tonges et al. | |
| 4,210,346 A | 7/1980 | Mowry, Jr. | |
| 4,227,720 A | 10/1980 | Mowry, Jr. | |
| 4,265,469 A * | 5/1981 | Mowry et al. | 283/94 |
| 4,310,180 A | 1/1982 | Mowry, Jr. et al. | |
| 4,341,404 A * | 7/1982 | Mowry et al. | 283/93 |
| 4,351,547 A | 9/1982 | Brooks, II | |
| 5,018,767 A * | 5/1991 | Wicker | 283/67 |
| 5,193,853 A * | 3/1993 | Wicker | 283/85 |
| 5,340,159 A | 8/1994 | Mowry, Jr. | |
| 5,707,083 A * | 1/1998 | Wallace | 283/93 |
| 5,788,285 A * | 8/1998 | Wicker | 283/93 |
| 7,092,128 B2 | 8/2006 | Wang et al. | |
| 7,126,721 B2 | 10/2006 | Wang et al. | |
| 7,148,999 B2 | 12/2006 | Xu et al. | |
| 7,180,635 B2 | 2/2007 | Wang et al. | |
| 7,193,751 B2 | 3/2007 | Wang et al. | |
| 7,738,143 B2 * | 6/2010 | Ishimoto et al. | 358/3.28 |
| 2002/0102007 A1 | 8/2002 | Wang | |
| 2003/0156753 A1 | 8/2003 | Fan et al. | |
| 2003/0223099 A1 | 12/2003 | Fan et al. | |
| 2003/0231349 A1 | 12/2003 | Wang et al. | |

(Continued)

*Primary Examiner*—Scott A Rogers
(74) *Attorney, Agent, or Firm*—Fay Sharpe LLP

(57) ABSTRACT

A variable data pantograph is formed by receiving a variable data string and retrieving at least one character representation from a vocabulary of character representations stored in memory. The retrieved at least one character representation corresponds to the variable data string. Each of the character representations in the vocabulary include a foreground region including a character shape and a background region suitably sized and arranged for encompassing the foreground region. The background region incorporates a first pattern of elements and the foreground region incorporates a second pattern of elements. The retrieved at least one character representation is assembled to form a variable data pantograph, whereby when the variable data pantograph is rendered in an original document, the foreground and background regions are similar in tone, the foreground and background regions being substantially less similar in tone in a copy of the original document to render the character visible.

24 Claims, 9 Drawing Sheets

U.S. PATENT DOCUMENTS

| | | |
|---|---|---|
| 2004/0000786 A1 | 1/2004 | Xu et al. |
| 2004/0001233 A1 | 1/2004 | Wang et al. |
| 2004/0051885 A1* | 3/2004 | Matsunoshita ............ 358/1.9 |
| 2004/0079800 A1 | 4/2004 | Sugino et al. |
| 2004/0101158 A1 | 5/2004 | Butler |
| 2004/0101159 A1 | 5/2004 | Butler |
| 2004/0103055 A1 | 5/2004 | Butler |
| 2004/0114160 A1 | 6/2004 | Wang et al. |
| 2004/0156078 A1 | 8/2004 | Wang et al. |
| 2004/0258272 A1 | 12/2004 | Fan |
| 2005/0123194 A1 | 6/2005 | Fan et al. |
| 2005/0128523 A1 | 6/2005 | Liu et al. |
| 2005/0128524 A1 | 6/2005 | Liu et al. |
| 2005/0161512 A1 | 7/2005 | Jones et al. |
| 2005/0162682 A1* | 7/2005 | Aritomi et al. ............ 358/1.14 |
| 2005/0237546 A1 | 10/2005 | Rahman et al. |
| 2005/0286083 A1 | 12/2005 | Wang et al. |
| 2006/0044617 A1 | 3/2006 | Wang et al. |
| 2006/0072159 A1 | 4/2006 | Eschbach et al. |
| 2006/0127117 A1 | 6/2006 | Eschbach et al. |
| 2006/0271787 A1 | 11/2006 | DeYoung et al. |
| 2007/0041628 A1 | 2/2007 | Fan |
| 2007/0058206 A1 | 3/2007 | Barnes |
| 2007/0091350 A1* | 4/2007 | Aritomi et al. ............ 358/1.14 |
| 2007/0139680 A1 | 6/2007 | Eschbach et al. |
| 2007/0139681 A1 | 6/2007 | Eschbach et al. |
| 2007/0139714 A1 | 6/2007 | McElvain |
| 2007/0177759 A1 | 8/2007 | Eschbach et al. |
| 2009/0245613 A1* | 10/2009 | Wu et al. .................... 382/137 |
| 2010/0123912 A1* | 5/2010 | Wang et al. ................. 358/1.9 |

* cited by examiner

VARIABLE DATA DIGITAL PANTOGRAPHS

BACKGROUND

The exemplary embodiment relates to the protection of documents. It finds particular application in connection with a method for incorporating variable data in documents which become visible when the document is copied.

As the quality of color copiers has improved, it has become easier to generate copies of a document which are indistinguishable from the original document. In many instances, the unauthorized copying of document content can have serious implications. For example, there is a concern that color copiers could be used to reproduce security documents, such as checks, stock certificates, automobile title instruments, and other documents of value, for illegal purposes.

One method which is used to authenticate documents and to reduce the unauthorized copying employs what is commonly called the VOID-pantograph. Common techniques for creating pantographs involve forming printed dots (or other elements) of two different sizes and frequencies, which are used to create regions of similar tone, corresponding to a textual warning and background, respectively, in an original (authentic) document. Tone refers to the visual appearance produced by halftone dots, bars, or marks which cover at least a portion of a printed area and which usually have a frequency that is measured in dots, lines, or marks per inch. To provide constant tone, the smaller elements have a higher frequency than the larger elements. Because the tone of the textual warning and the tone of the background pattern are selected to be the substantially the same, these two regions have a similar visual impact on an observer of the original document, and the textual warning is not readily perceived.

On copying, however, the situation changes. Since the response of an image sensor employed in the scanner is different from the response of the human visual system, changes in the relative tone of the two different areas will appear. These changes are due to the different frequency response of the sensor (with respect to the human eye) and also due to other, normally non-linear, effects, such as a detection floor or threshold, where signals below a certain level are simply "lost." In general, the high frequency components are more strongly affected and attenuated. The difference in response of the scanner expresses itself as a relative change in tone in the copy and thus the hitherto invisible textual warning becomes visible. For example, in the resulting copy, only the larger printed dots are apparent. These larger dots spell out the word "void," or other pre-determined textual warning.

In current techniques, the pantograph is applied to the substrate to create a pre-printed carrier. An image to be protected is then applied to the pre-printed carrier.

These methods have generally been successful in protecting documents, and are sometimes combined with other techniques, such as the use of camouflage patterns, and the like. However, they are static in nature and thus in general are limited to generally valid, partly nondescript words like "void" or "copy."

There remains a need for a system and method for creation of a dynamic pantograph based on variable input data which enables document-specific or owner-specific data to be incorporated into the pantograph.

INCORPORATION BY REFERENCE

The following references, the disclosures of which are incorporated herein in their entireties by reference, are mentioned:

U.S. Pat. No. 4,168,088 issued Sep. 18, 1979, entitled PROTECTED DOCUMENT AND METHOD OF MAKING THE SAME, by Somlyody, discloses document for preventing unauthorized copying having on a top surface, background printed matter made up of small areas of substantially the same size and shape. A warning word is printed on the top surface and blended with the background printed matter. The warning word is made up of small areas of substantially the same shape as the background but of a different size such that the warning word cannot be detected by a viewer, but will be visible upon reproduction by a copying machine.

U.S. Pat. No. 4,210,346, issued Jul. 1, 1980, entitled PROTECTED DOCUMENT BEARING WATERMARK AND METHOD OF MAKING, by Mowry, Jr. et al., discloses security document adapted for use with a xerographic color copier having a lens reproduction system which has a reproduction density threshold which at normal operator accessible copier settings reproduces dots of a tone density which are larger than the reproduction density threshold and which does not resolve and consequently does not reproduce dots of a tone density which are smaller than the threshold. The document includes a substrate and a security background printed on the substrate which includes a warning mark composed of a dot pattern of a plurality of relatively large dots patterned so as to comprise the warning mark. The pattern is surrounded by a plurality of spaced small dots. The dots are registered so as to be in phase with the large dots being spaced a distance which is a multiple of the distance between the small dots. The large dots and small dots are aligned as a parallel screen with the pitch of the smaller dots being twice the pitch of the large dots. The large dots and smaller dots are camouflaged by a camouflage overlay pattern printed as a visually confusing and obscuring pattern.

U.S. Pub. No. 20070139681, published Jun. 21, 2007, entitled PRINTED VISIBLE FONTS WITH ATTENDANT BACKGROUND, and U.S. Pub. No. 20070139680, published Jun. 21, 2007, entitled VARIABLE DIFFERENTIAL GLOSS FONT IMAGE DATA, both by Reiner Eschbach, et al., disclose methods for supplying differential gloss or other correlation mark text into a document image via a font definition, particularly as when desired in the employ of rendering variable data. A font character is selected and sub-sampled. The sub-sampled result is then scaled up into a full size result. A first halftone cell having a first anisotropic structure orientation is selected and applied to the full size scaled font result while a second halftone cell having a second anisotropic structure orientation is applied to the surrounding background around the full size scaled font result to create a gloss font or other correlation mark character. This full gloss font character or correlation mark character is then stored as a font representation as callable by the digital front end of a printing apparatus.

BRIEF DESCRIPTION

In accordance with one aspect of the exemplary embodiment, a method of forming a variable data pantograph includes receiving a variable data string and retrieving at least one character representation from a vocabulary of character representations stored in memory. The retrieved at least one character representation corresponds to the variable data string. Each of the character representations in the vocabulary includes a foreground region including a font body image shape and a background region suitably sized and arranged for encompassing the foreground region. The background region incorporates a first pattern of elements and the foreground region incorporates a second pattern of elements. The at least one character representation is assembled to form a variable data pantograph. When the variable data pantograph is rendered in an original document, the foreground and background regions are similar in tone. The foreground and background regions are substantially less similar in tone in a copy of the original document to render the font body image shape visible.

In accordance with another aspect, a method of generating a font representation includes receiving a set of characters to be represented in the font representation and, for each of the characters, rasterizing the character at a reduced resolution to form a grid in which each location in the grid is designated as ON or OFF. For each ON location, a first base pattern comprising a first element is assigned and for each OFF location, a second base pattern comprising a second element is assigned. The character representation is stored in memory, a set of the stored character representations forming the font representation. The first and second base patterns are selected to provide regions of similar tone when rendered in an original document, which regions being substantially less similar in tone in a copy of the original document to render the character visible.

In accordance with another aspect of the exemplary embodiment, a system for generating a variable data pantograph includes a reception component which receives a variable data string. A memory stores a vocabulary of character representations, each of the character representations in the vocabulary including a foreground region including a font body image shape and a background region suitably sized and arranged for encompassing the foreground region. A generation component retrieves a selected at least one of the character representations from the vocabulary which is/are to form a variable data pantograph corresponding to the received variable data string. Optionally, an applying component applies the variable data pantograph to an input image, whereby when the variable data pantograph is rendered in an original document, the foreground and background regions are similar in tone, the foreground and background regions being substantially less similar in tone in a copy of the original document to render the character visible.

In accordance with another aspect, an electronically stored vocabulary of character representations resides in memory for use in a printing system. Each of the stored character representations includes a foreground region having a character shape and a background region suitably sized and arranged for encompassing the character shape. A first pattern of elements is incorporated into the character representation to define the foreground region and a second pattern of elements is incorporated into the character representation to define the background region, whereby when the character representation is incorporated in a variable data pantograph which is rendered in an original document, the foreground and background regions are similar in tone, the foreground and background regions being substantially less similar in tone in a copy of the original document to render the character visible.

DETAILED DESCRIPTION

Figure 1:
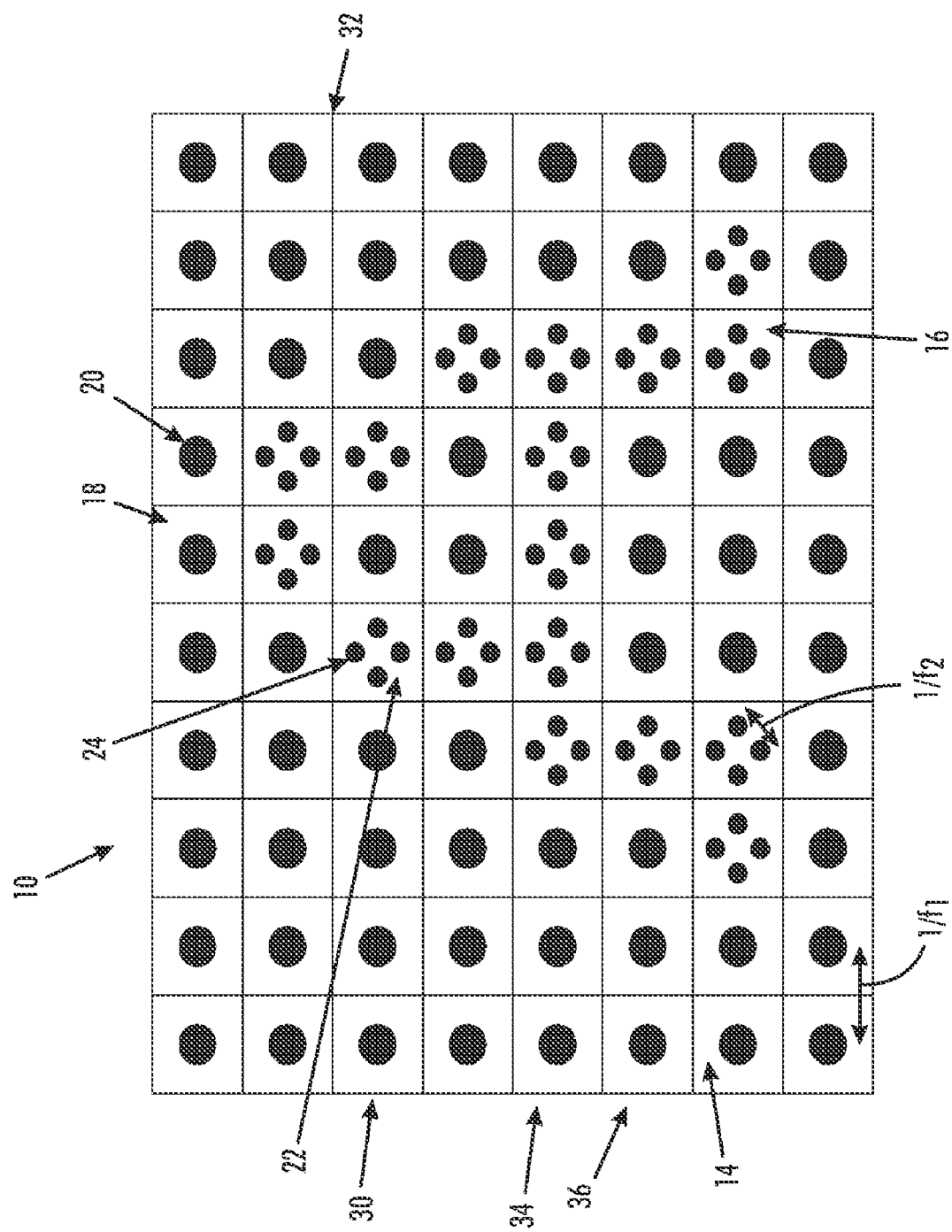
FIG. 1 is a greatly enlarged view of a stored character representation suitable for use in creation of a variable data pantograph in accordance with a first aspect of the exemplary embodiment.

In the following, a system and method for creation of a pantograph is described which can eliminate the limitations of existing methods by making the pantograph a variable data imaging element that can be created dynamically and that can encapsulate document content in the document protection. The exemplary method allows the textual warning to have a generalized capability, such as "*Copied from an Original owned by ABC Corp.*" or "*If found contact* 555-1234" or any other variable data string. It will be readily appreciated that the deterrent effect of such a personalized textual warning can be greater than for a static, nondescript warning. Consequently, the likelihood that such a document may be negligently or intentionally furnished to an unauthorized party is considerably diminished.

As will be appreciated, when requesting, say the letter "A", in any one of a set of various font representations available in the system, the human reader will not perceive anything resembling an alphanumeric character. Rather in the printed original document, the user will perceive an area (generally rectangular) of constant tone and color. It is only after copying or scanning that the area changes to exhibit a human readable "A", in this example. Close examination of the constant tone area, however, e.g., under a microscope, will allow an expert to "trace" the outline of the character by tracing the boundary between two distinct pattern areas of high and low frequency printed elements.

Aspects of the exemplary embodiment relate to a method and system for generating a digital pantograph that permits the incorporation of variable data and that can be created in real-time. This can be achieved by creating a pantograph vocabulary of one or more font representations, each font representation comprising a finite set of character representations. These character representations can be arbitrarily combined into a meaningful variable data sequence: a variable data pantograph.

Each of the character representations includes two regions: a first region, which can be considered as the foreground region having a font body image shape, and a second region or background region, which constitutes a field area that is suitably sized and arranged for encompassing the font body image shape. The foreground and background regions are abutting and are sparsely populated with elements which provide similar tone to the regions in an original document but which respond differently to copying such that differences in tone then become apparent, making the font character represented by the character representations visible.

Tone refers to the apparent gray level. In the case of halftoning, tone refers to the visual effect produced by halftone dots, bars, or marks which cover a portion of a printed area and which usually have a frequency that is measured in dots, lines, or marks per inch. The elements are sufficiently tiny that they are blended into a smooth tone by the human eye. Because the tone of the foreground area representing a character and the tone of the background pattern are selected to be the same, these two areas have much the same visual impact on an observer of the original document, and the character or phrase is not readily perceived. The optics of color copiers usually exhibit a different response characteristic to that of the human eye. For example, copiers are typically unable to accurately reproduce relatively small or high frequency halftone dots, lines, or other elements. As a consequence, reproduced copies of the original document will have a noticeable difference in tone, rendering the previously essentially unrecognizable character(s) visible. It is well known in the art that the image reproduction of a copier/scanner is influenced by the optics employed, the sensor elements, the image processing, etc. For simplicity we will not distinguish the components in the description, since the overall attribute is the resultant difference in tone of the copy/scan.

The variable data to be represented can take the form of characters selected from a finite set of characters which is referred to herein generally as a vocabulary, which may be variably arranged in any selected order to form words, phrases, number sequences, other character sets, or any desirable combination thereof.

In various aspects, a set of character representations is electronically stored in memory for use in a printing system. The set of stored character representations may form a pantograph vocabulary whereby selected character representations may be retrieved from memory and arranged, e.g., concatenated to form a variable data pantograph representing a selected text string, such as a word or phase, or arranged to form other patterns of character representations in a rendered document. The character representations in the vocabulary may represent characters in a particular font. As will be appreciated, sets of characters for different fonts may be provided, i.e., a plurality of font representations.

The term "font" is used herein to indicate the Page Description Language (PDL) concept of a font, where the font can contain standard ASCII characters, but also other characters, e.g. Kanji, symbols, small icons, lines, bar codes and other elements that are commonly represented in a binary state modus, as illustrated, for example, in U.S. Pub. No. 20070139681, incorporated by reference. The exemplary vocabulary can thus incorporate, for example, the letters of any alphabet (such as Latin, Greek, Cyrillic, a combination thereof or the like) and/or numbers, e.g., the numbers 0-9. Other characters, such as common icons, arrows, and other symbols may also be included in the vocabulary.

Figure 2:
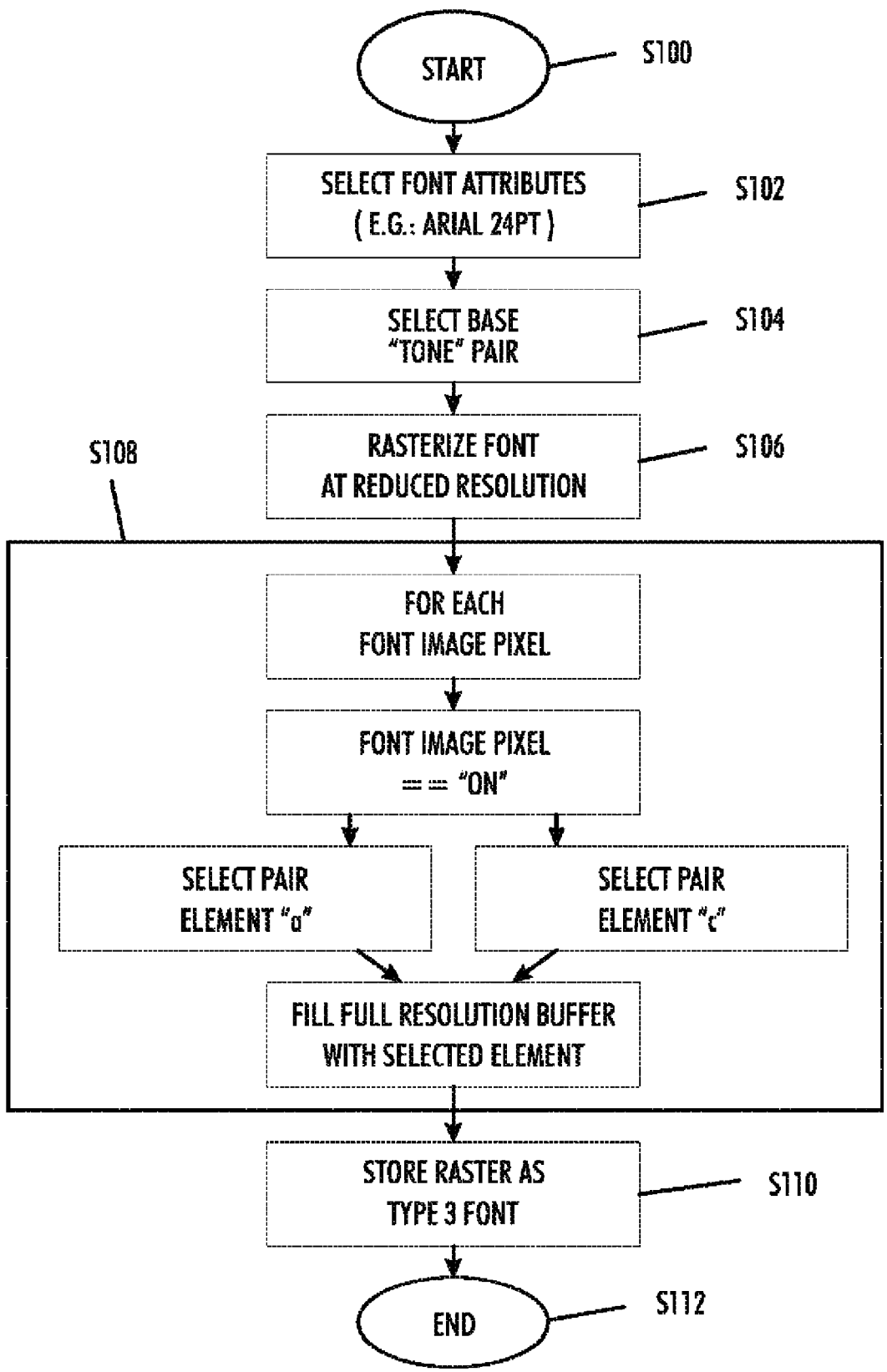
FIG. 2 illustrates a method for the creation of the variable data character representation of FIG. 4.
Figure 3:
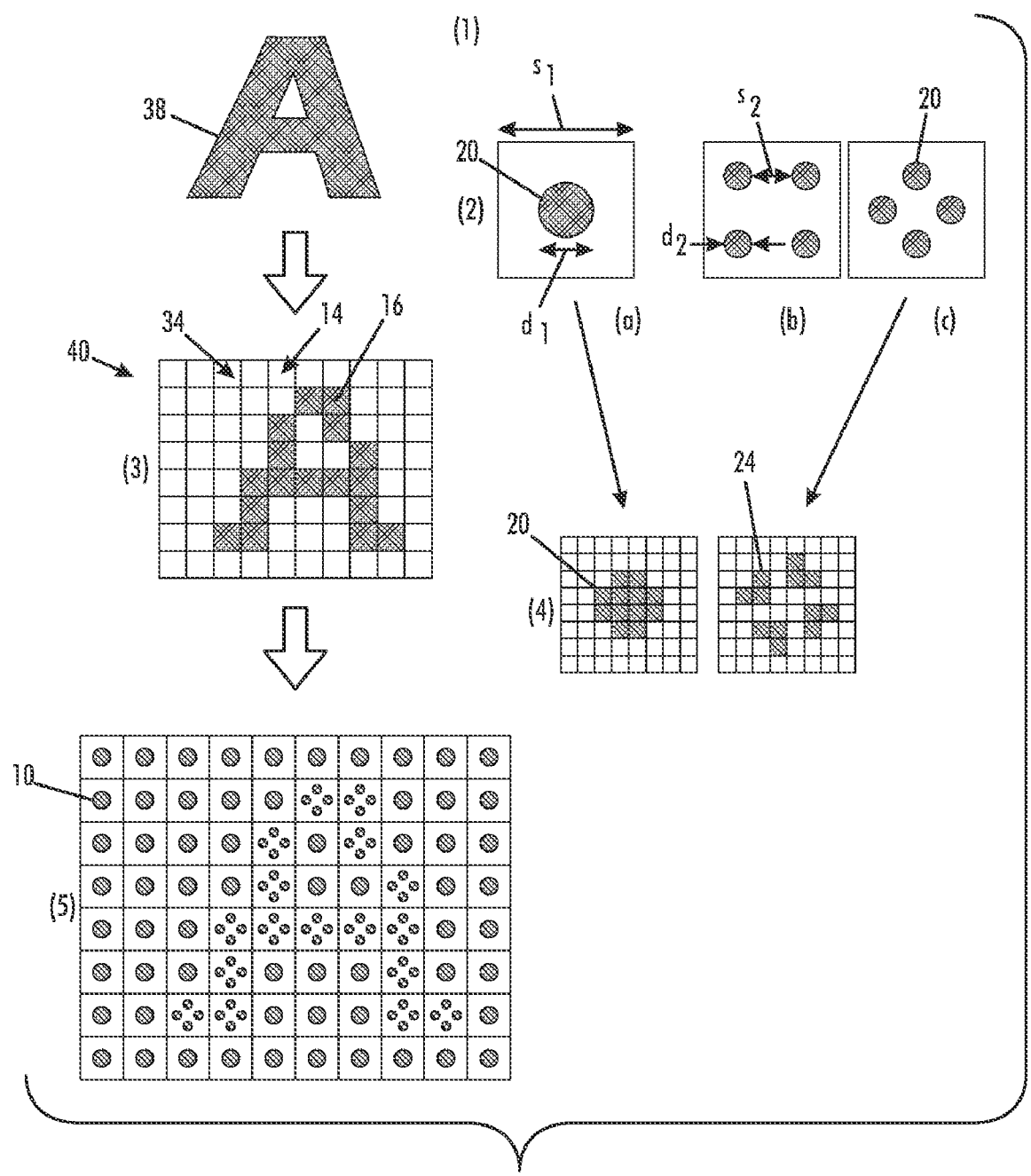
FIG. 3 graphically illustrates some of the steps in the method of FIG. 2.

FIG. 1 depicts an exemplary character representation 10 (here illustrated as a representation of the letter A) which can be produced by the method shown in FIGS. 2 and 3. Such a character representation 10 can be stored in memory for subsequent retrieval and assembly with other character representations to form a variable data pantograph 12 of the type shown in FIG. 4.

The character representation 10 includes a background region 14, which forms a field area, and a foreground region 16, entirely contained therein and contiguous therewith. The union of background and foreground regions 14, 16 may be of any suitable shape, such as rectangular, hexagonal, or the like which permits a sequence of character representations to be seamlessly arranged in any desired order for rendering as a void pantograph. For convenience, rectangular shapes are employed for the background 14. The foreground region 16 has a shape which corresponds generally to that of a character to be represented by the character representation 10. As will be appreciated from the following description, the terms "foreground region" and "background region" are used for convenience to identify two regions of a character representation which are of similar tone but which respond differently to copying and are not intended to imply that the regions are distinguishable in an original document or that they need to be stored as separate elements in a data structure.

A first pattern 18 of elements 20 is applied in the background region 14 to fill the background region and a second pattern 22 of elements 24 is applied in the foreground region 16. The patterns 18, 22 may be formed from dots, lines, or other elements 20, 24. In the illustrated embodiment, the elements 20, 24 are dots of different sizes. The dots may be as described in U.S. Pat. No. 4,210,346. The arrangements of dots can be created by a design process, as described in further detail below.

The foreground region 16 has a similar tone to the background region 14. In particular, the background region has elements 20 of a first size (which may be expressed, for example, as an object size or as the number of pixels in a halftone structure) and a first spacing $s_1$ ($s_1=1/f_1$, where $f_1$ is the frequency, which may be expressed as elements 20 per unit length). The foreground region 16 has elements 24 of a second size and second spacing $s_2$ ($s_2=1/f_2$, where $f_2$ is the frequency, which may be expressed as elements 24 per unit length) the second size being different from the first size and the second spacing being different from the first spacing. It is to be understood that "unit length" is replaced by "unit area" for the actual 2-dimensional case. In one embodiment, the first and second patterns are substantially identical other than with respect to the size and frequency of the elements. In other embodiments, the elements may differ in shape, color, or other aspect while still providing a visibly similar or identical tone in the original document. In some embodiments, any slight variations in tone are masked by introducing a distraction pattern, or camouflage, as disclosed in above-mentioned U.S. Pat. No. 4,210,346, incorporated by reference.

In the exemplary embodiment, the elements 20, 24 of the two regions 14, 16 are simultaneously encapsulated inside each of the character representations 10. The entire font character representation can thus be stored as a single data set. The rendering system is thus not aware of the foreground/background distinction which is described herein primarily for purposes of human understanding. To the rendering system, a rectangular area is simply rendered containing two differently textured regions.

The elements 20, 24 respond differently to copying, such that in a copied document, the regions 14, 16 are no longer of similar tone but differ in tone. As a result, a copy of the original document made on a color copier displays a cancellation term. In one embodiment, elements of one of the first size and the second size are sufficiently small such that, when in an original document incorporating the character representation, they are not reproduced by a color copier at a particular copier setting while elements of the other of the first size and the second size are sufficiently large such that they are reproduced by the color copier at the particular copier setting.

The exemplary rectangular background region 14 is of sufficient width w to provide a character-area of toroidal symmetry (left side 30 matches up to the right side 32, using a sparse repeat pattern of elements 20 (with a spacing corresponding to a frequency $f_1$). The toroidal symmetry allows the seamless stitching of arbitrary tiles. The sparse repeat pattern facilitates the "unobtrusive nature" as well as easier placement of character outlines. The character pattern 22 for foreground region 16 is designed using a related sparse repeat pattern of elements 24 (with a spacing corresponding to a frequency $f_2$) with a clear distinction in expected copier response. This distinction can be generated by varying frequency, shape, orientation or any combination thereof.

In the exemplary embodiment, the character representation 10 is defined by an imaginary n×m grid 34 in which each square 36 of the grid has one of two (or more) dot patterns assigned to it wherein the dots 20, 24 are entirely contained within the respective grid square. As will be appreciated, in FIG. 1, the grid lines are shown for clarity only and are not a part of the stored character representation 10. In this way, all characters can be created as individual character representations 10 and embedded as a pantograph font and can be requested using standard workflow mechanisms.

FIGS. 2 and 3 illustrate one embodiment of a method for creating a character representation 10 of the type shown in FIG. 1. It is understood that some of the steps of the method do not need to be performed in the order illustrated and may be parallelized, interchanged, or new or different steps employed. The method begins at S100.

At S102, font attributes for a character 38 to be represented are selected, such as character set, shape, size, etc. For example, in FIG. 2, the font type "Arial" and the font size 24 are selected for generating a character representation of the character "A," in a selected font representation, as shown at (1) in FIG. 3. Here, "character" refers to a logical entity that is represented in one of many known forms, such as outlines, splines or any other graphical or image description.

At S104, a base pair of patterns 18, 22 of similar tone is selected. Each of the base patterns 18, 22 is formed of a respective one of the two (or more) types of elements 20, 24, which may be arranged singly or in combination at a selected spacing and orientation. The exemplary patterns 18, 22 are of the same size and shape so they can be tiled together to form the character representation. At this stage, the tone is only defined in terms of size ($d_1$, $d_2$) and spacing/frequency of the elements. At a later stage, it may be modified with actual color descriptors, such as "cyan", "red", etc. In general, the two base patterns 18, 20 selected for the regions 14, 16 differ in at least one of: size of elements; number of elements per pattern; spacing/frequency of elements; and shape of elements.

For example, as shown in FIG. 3, a first pattern (a) having a single centrally spaced element 20 with a spacing $s_1$ and size $d_1$ is selected as the base pattern 18 for the background 14 of the character representation 10 (here, the "off" pixels of a character image). A second pattern (b) or (c) with elements 24 having a spacing $s_2$ and size $d_2$ is selected as the base pattern 22 for the foreground region 16 of the character representation 10 (here, the "on" pixels). The second base pattern 22 includes a plurality of the second elements 24, four in the illustrated embodiment, being equivalent to a "doubling" of the linear component as defined above. The second base pattern 22 may have a plurality of optional configurations as shown at (b) and (c).

As will be appreciated, the elements 20, 24 are shown much larger in FIG. 3 than the elements will appear in the printed document. In this exemplary description, patterns (a) and (c) have been selected for the base pair 18, 22. While the elements 20, 24 are represented as circles, in other embodiments, they may be selected from a set of rasterized base elements as illustrated in FIG. 3 at (4). Each of the second base patterns (b) (c) is configured to have the same visual tone as the first base pattern 18 when embodied in a printed document. The base patterns (a), (b), (c) may thus each have the same overall gray level. For example, as illustrated at (4), each pattern has the same number (twelve) of on "ON" pixels in the idealized case.

As will be appreciated, the exemplary method is not dependent on the manner in which the regions 14, 16 of the character representation are created and that the exemplary patterns 18, 22 are but one way of generating the character representation which facilitates the creation of individual character representations in a standardized way such as through Xerox FreeFlow™ VIPP Specialty Imaging.

At S106, for each character 38 to be represented as a character representation 10, the character is rasterized to form a rasterized character image 40. The rasterizing is generally performed at a reduced resolution from that normally used for the character 38. For example, as shown at (3) in FIG. 3, the character image "A" is rasterized in a 10×8 pixel grid, although larger or smaller grids are also contemplated. In general, a reduction in resolution by at least a factor of three in each dimension is convenient, and in one embodiment, a factor of at least four, such as about eight may be used. Thus, for example, a character "A" which is generally stored as an 80×64 pixel data structure in a given font representation may be readily reduced to a 10×8 pixel grid by combining a block of 64 pixels into one pixel of the grid.

The purpose of the rasterization is to create a grid of pixel locations 36 (here rectangles) which are each large enough to receive one of the base patterns 18, 22, and thus the reduction in resolution may vary, depending, for example, on the pixel size of the original character 38 and the rendering capabilities of the printer, and so forth.

Figure 5:
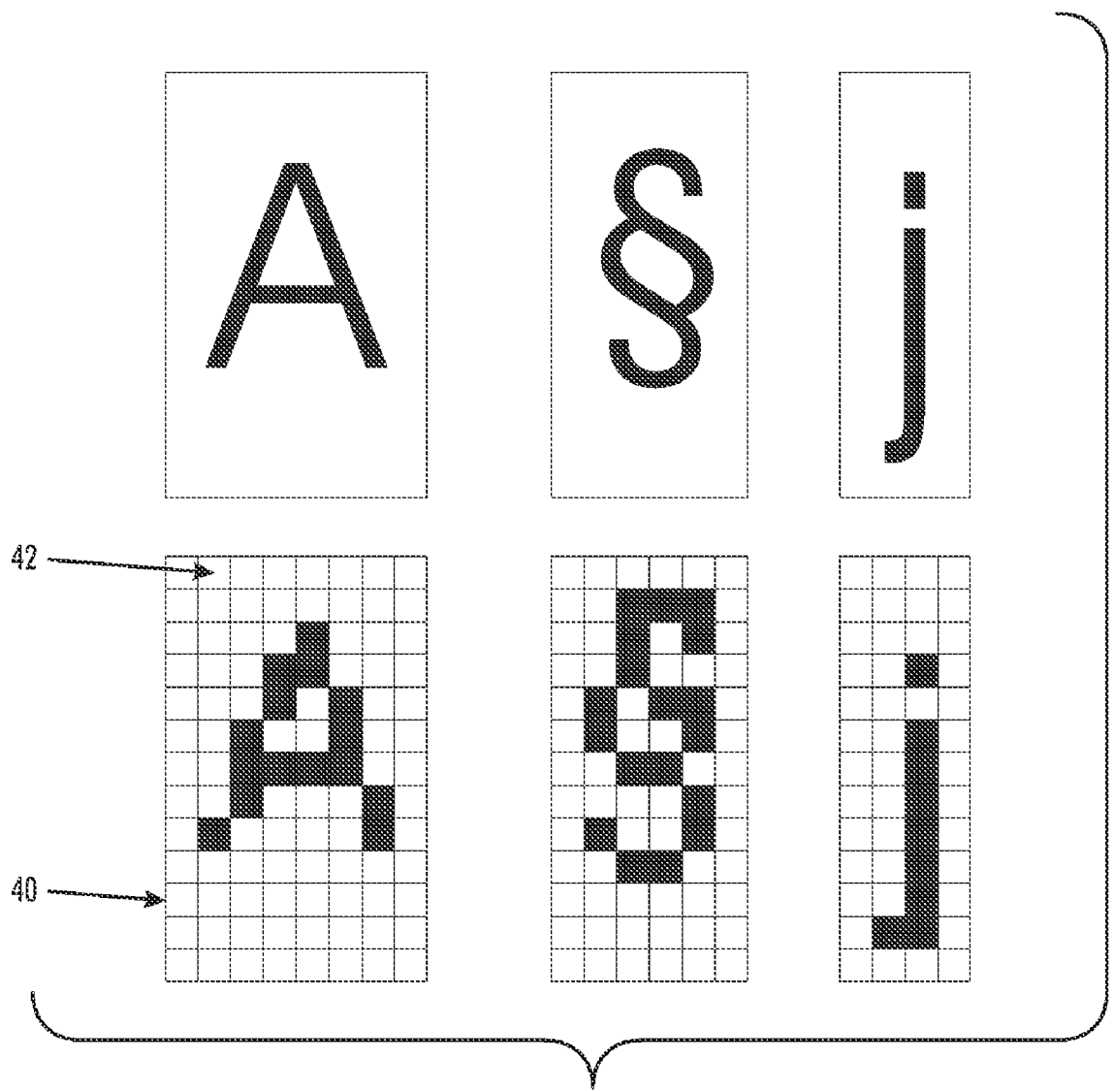
FIG. 5 illustrates three different rasterized characters.

With reference now to FIG. 5, which shows by way of example, grids 34 for the characters A, §, and j, the pixel height of the grid (13 pixels in the exemplary embodiment) may be a constant for all character representations in the selected font representation. This is similar to the common point definitions used in printing, where the point number (e.g., 12 point) represents the lead height of classical letter setting. To allow small characters to be represented (as well as characters with a defined descender which extends below the line) while retaining the same pixel height for each grid, the grid for any given character may include one or more blank rows 42, either at the top or bottom of the grid 34 or both. Additionally, a spacer row or rows may be incorporated, e.g., at the top and at one or both sides, which is always blank, so that the character representations can be tiled vertically as well as horizontally without contact between respective foreground regions 16. Thus, while in rasterization, the letter "A" may be reduced in resolution to an 8×10 grid, the letter A is appropriately located in an 8×13 grid 34, for example, to ensure that all characters in the set can be represented at constant grid height of m pixels.

As also illustrated in FIG. 5, the pixel width of the grid may vary, depending on the particular character to be represented. Thus, for example, the grid for the character "A" is 8 pixels in width, while the character "j" is only 4. As will be appreciated from FIGS. 2 and 5, the grids at reduced raster automatically enforce the required toroidal symmetry, thereby ensuring that character representations can be seamlessly tiled in two dimensions.

At this stage, the rasterized character images 40 in the set typically still have a human-recognizable form. Each pixel location in the grid 34 can assume one of two states, "ON" or "OFF." For simplicity in FIGS. 3 and 5, the character pixels are described by "OFF" (white) for the background and "ON" (black) for the foreground (character). As will be appreciated, steps S102-S104 can be performed in advance for all characters in the set. The actual character image 40 is then retrieved from memory at S106.

Returning once more to FIG. 2, at S108, each character image pixel in the "OFF" state is replaced with the first base pair pattern (a) and every pixel in the "ON" state is replaced with the second base pair pattern (c). See, for example at (5) in FIG. 3. Each base pattern (a), (b), (c) is the same size and shape is thus configured for substitution with any pixel 36 of the reduced resolution rasterized character 40. At S110, the character raster image 10 is then stored inside the new pantograph font at the logical location of the input character in the input font. In this example, a so-called Type 3 Font is used.

The steps are repeated as necessary for every character of the input font.

The method ends at S112.

It should be noted that the font character 38 is rasterized to the reduced resolution in a way that the combination of the lower resolution with the base pattern size results in the intended size at print resolution. The selection of the font (S102) has an impact on the overall variable data pantograph usability, since some graphical designs of fonts do not favor rendering at a reduced resolution. Although more elaborate graphical characters can be used, it is generally more effective if a simpler visual representation of the logical character is employed. For simplicity, the rasterization effect illustrated at (4) is not shown in (5).

The result has intended print resolution, since the base pattern pairs will be rendered at print resolution, whereas the font image as rendered at the lower resolution defined by the ratio of print resolution and base pair periodicity. This conversion to higher resolution might be performed at this step by using the appropriately rastered versions of the base pairs, or at a later step by rasterizing the graphic description of the base pairs.

As will be appreciated, more than one character representation 10 may be stored for representing the same character 38. Additionally character representations may be stored for different character sizes or font styles. For example, character representations may be separately stored for font size 36 point and font size 96 point and character representations may be separately stored for generating variable data pantographs with character representations similar to Times New Roman and Arial characters. Each of the plural character representations may be individually tailored to maximize the blending of foreground and background regions so that they appear similar in tone.

The character representation 10 may be stored in any convenient format. A suitable character representation format is one that that is efficiently handled by a DFE (Digital Front End) such as DocuSP® that uses the font in a variable data application such as VIPP® (Variable Data Intelligence Postscript Printware) and other various document management software, such as FreeFlow™.

In one embodiment, the elements 20, 24, when rendered on print media, may be less than 1 mm in size, e.g., average diameter, such as about 0.3 mm or less. The elements 20 may have a size (e.g., number of pixels) which is at least twice that of elements 24, or vice versa.

While in the exemplary method, the background and foreground regions 14, 16 of the stored character representation are created by tiling repeat patterns 18, 22, in other embodiments, the dots 20, 24 may be applied to the foreground or background region as a whole, such that some of the dots may be cut at the edges of regions 14, 16. In such an embodiment, the design of the individual foreground characters is such that it avoids cutting through the repeat pattern of the regions 14, 16 as much as possible and/or allows "matched" cutting so that the cut smaller elements 24 of the foreground 16 contact the cut larger elements 20 of the background region 14, where possible. The size and position of the foreground character 16 may be selected to provide similar phasing of the two patterns of dots 20, 24, along with a clear outline of the letter. Otherwise, non-linear effects of the human visual system may not allow the 'letter' to blend sufficiently into the 'background' to avoid detection in the original document.

In yet other embodiments, the character representations 10 are stored as bitmaps similar to grid 40 and the different patterns formed by substitution of patterns 18, 22 at the time of printing or by halftoning the regions 14, 16 with two different halftone screens, as described, for example, in U.S. Pub. No. 20070139681, incorporated by reference.

Figure 4:
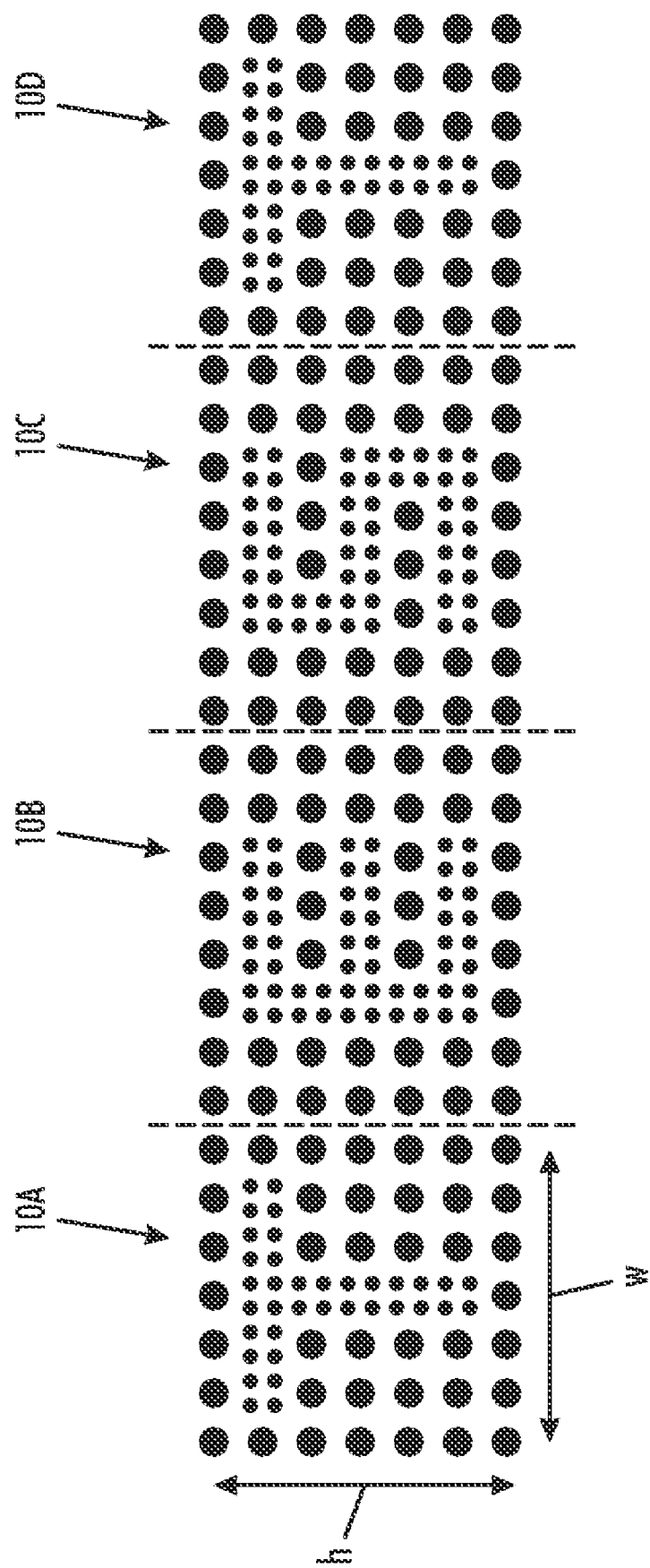
FIG. 4 illustrates an exemplary variable data pantograph which may be generated by concatenating a character representations of the type shown in FIG. 1.

As shown in FIG. 4, a variable data pantograph 12 may be generated by combining two or more of the stored character representations 10. In FIG. 4, four character representations 10A, 10B, 10C, and 10D are arranged in sequence to represent the word TEST, by way of example, although the possibilities are virtually limitless. The background region 14 for each of the character representations 10A, 10B, 10C, and 10D may be of the same height h as that of the other character representations in the same font representation in the stored finite vocabulary. Different font representations may have a different height h. The height h may be an integer multiple of the pattern spacing for periodicity reasons. For example, if the background pattern 18 is the coarser of the two patterns, the height h may be an integer multiple of that periodicity. This requirement guarantees that two lines of text vertically abutting will do so without a visual artifact at the boundary location. The background region may similarly have a width w that is a function of the size of the grid elements 36 (which in the equals frequency of elements 20. For different characters, different character widths w may be appropriate, as shown in FIG. 5. This may be described as a toroidal symmetry requirement for each character representation in the font representation.

In the illustrated embodiment, each character representation 10A, 10B, 10C, and 10D corresponds to a single character 38, such as a letter, but it can readily be envisaged that a character representation may be stored which includes several foreground regions 16, each representing a different letter. For example, one character representation could be stored in memory corresponding to the entire word VOID. Additionally, to provide spaces between words one or more "blank"representations may be stored which each includes the background (or foreground) region only.

As with conventional void pantographs, the variable data pantograph 12 illustrated in FIG. 4 may be utilized, for example, to provide security information for a ticket, coupon, or the like, to provide an indicia as to the source of the image, to provide personalized information in mass mailings, or to provide time varying information, such as a date on which the image is printed, and may include job processing/integrity numbers, bar-codes, company trademarks or logos, or the like. Variable data pantographs applied to such uses discourages falsification or fraud while serial numbers or other changing characters allows for tracking. In one embodiment, a variable data string is generated as a function of the IP address or other information identifying the workstation/user sending the original document to a printer such that an unauthorized copy of the document can be traced back to the person who printed the original document. For example, the simple "VOID" message can be implemented with character representations which provide tracking information, such as "This document leaked by J. Doe".

The character representation 10 has an associated font color, upon which the standard color operations can be performed. In general, foreground and background regions 14, 16 have the same color. This means that in most cases the character representation 10 will have but a single color. For example, in the rendered document, both the foreground and background regions may be formed with the same color separation, such as cyan, magenta, cyan, or yellow. By selection of patterns of elements 20, 24 which yield similar tone in an original document, as viewed by the unaided eye of a casual observer, variable data can be easily incorporated by retrieving the stored character representations and assembling them in a selected arrangement.

Figure 6:
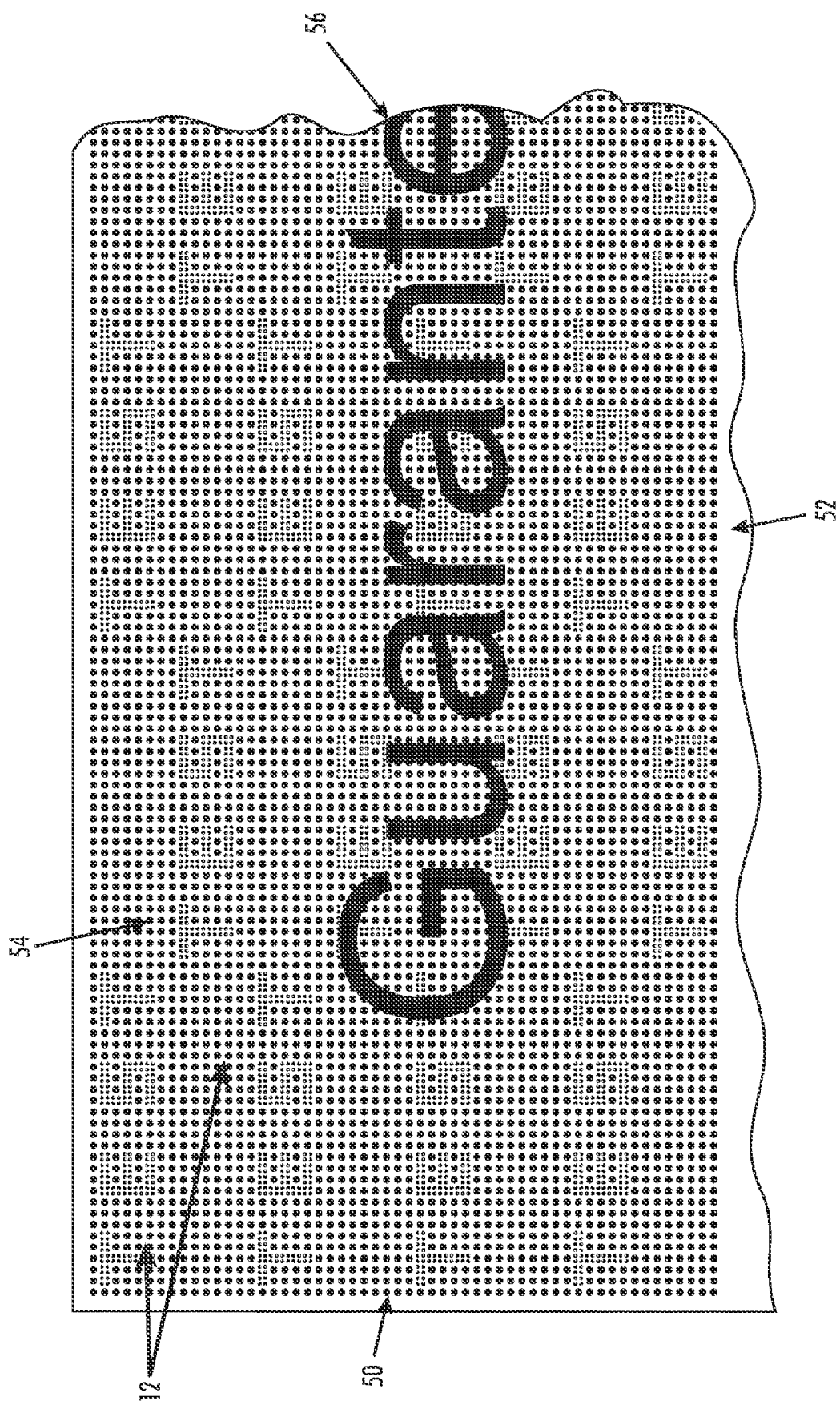
FIG. 6 illustrates a portion of an original document incorporating the variable data pantograph of FIG. 4.

In the exemplary embodiment, the selected character representations 10 are rendered on a substrate, such as paper or plastic, by printing. Therefore, the foreground and background regions 14, 16 appear to have substantially the same tone to the unaided eye of an observer. FIG. 6 illustrates an exemplary variable data pantograph 12 as it may appear in an original document 50 when rendered on a substrate 52, under high magnification. The rendered variable data pantograph 12 is formed from a sequence of different character representations 10A, 10B, 10C, and 10D from a selected font representation, which have been concatentated to create the word TEST, as illustrated in FIG. 4. It will be understood that the string "TEST" shown in FIG. 6 is not visible as a difference in tone, but as a change in texture under this high magnification. At standard size, as it would be used in the present application, this texture difference is invisible to the human eye and the word would thus not be readable.

In FIG. 6, by way of example, the same variable data pantograph 12 has been tiled across the substrate surface to form a pattern. Blank representations 54 are used to complete the pattern. The document 50 also includes rendered image data 56. In one embodiment, the rendered image data 56 is rendered with at least one color separation which differs from that used in rendering the variable data pantograph 12. For example, the variable data pantograph may be rendered in yellow ink or toner and the image data in one or more of cyan, magenta, and black inks or toners.

Figure 7:
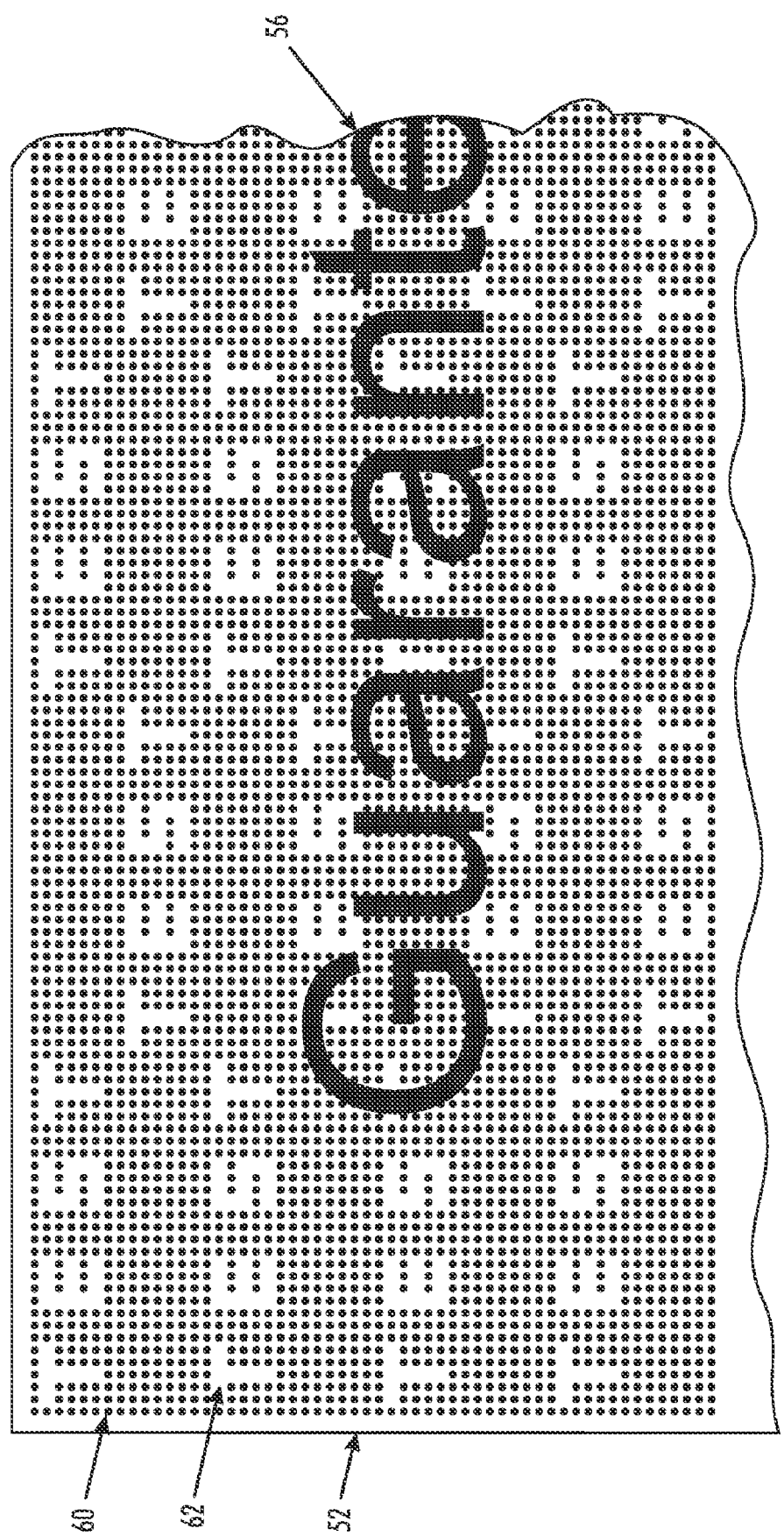
FIG. 7 illustrates a portion of a copy of the original document incorporating the variable data pantograph of FIG. 4.

FIG. 7 illustrates a copy 60 of the original document 50 shown in FIG. 6. Here, the smaller dots used in generating the foreground region 16 were too small to copy effectively and the foreground region 16 appears blank (or at least much lighter in tone than the background region 14). The exposed variable data string 62 (e.g., TEST), sometimes referred to as a cancellation term, is clearly apparent to the unaided eye.

Figure 8:
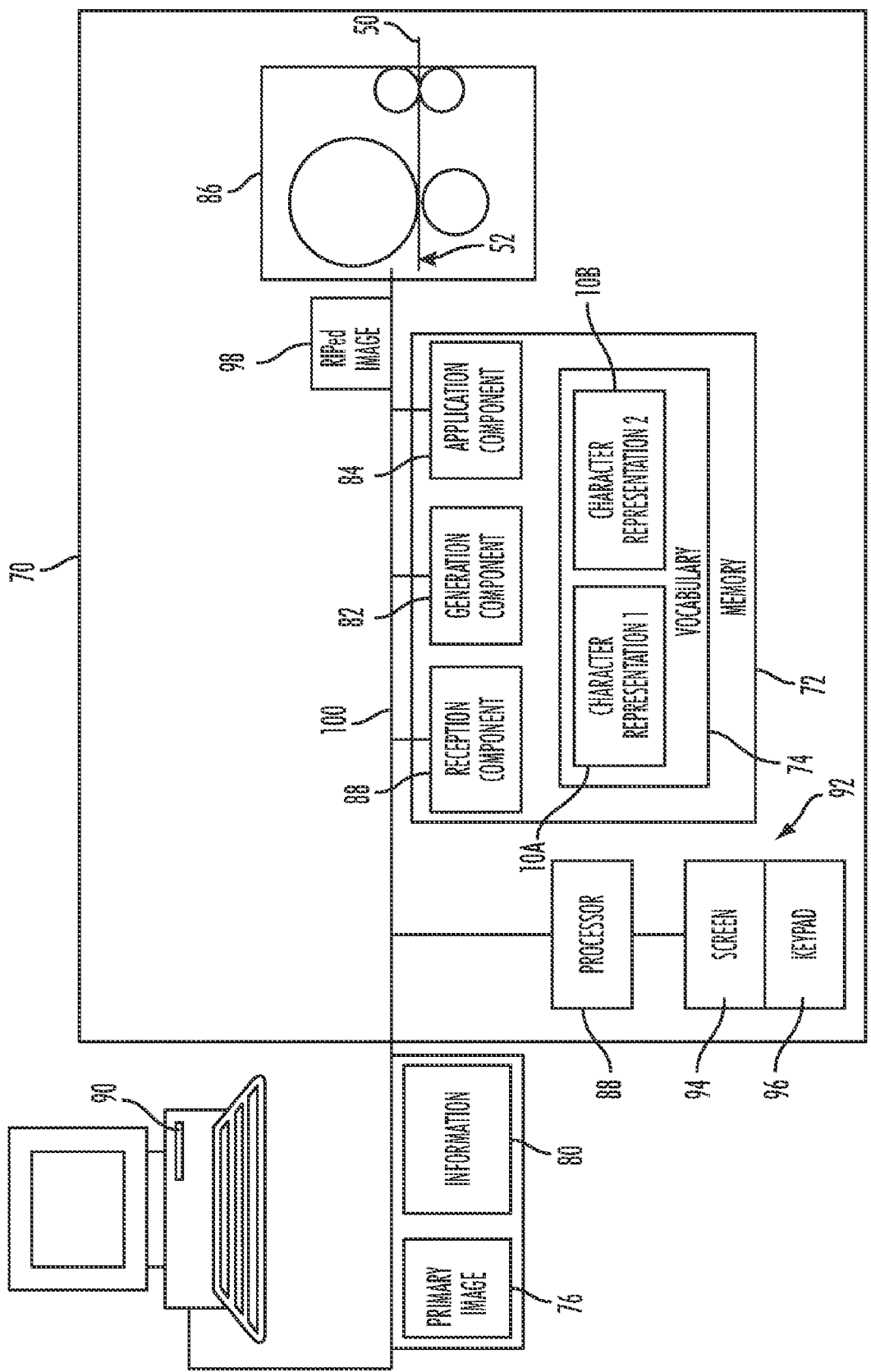
FIG. 8 illustrates a system for incorporating a variable data pantograph in an original document, in accordance with a second aspect of the exemplary embodiment.

As illustrated in FIG. 8, a printing apparatus 70 may be provided having electronically stored, e.g., in memory 72 accessible to the printing apparatus, a vocabulary 74 of the electronic data character representations 10 (here illustrated as character representations 1 and 2) which can be retrieved and assembled in any desired arrangement, to form a variable data pantograph 12 which is rendered along with an image 76, onto a substrate 52 to form an original document 50. The printing apparatus may include a reception component 78 which receives information 80 concerning a variable data string to be represented as character representations, and a generation component 82 for retrieving the selected data character representations 10 from memory 72, based on the received information 80, and assembling them in an arrangement in accordance with the received information. The information 80 received by reception component 78 may include the variable data string to be represented (such as the sequence of characters of the word VOID) or the reception component 78 may receive the variable data string from another source, based on the information 80. The generation component 82 may tile the generated pantograph 12 of character representations in order to form a pattern of such pantographs over at least a portion of the original document 50 or over the entire document 50. In other embodiments, only a small area of the image 76 is targeted for incorporation of the variable data pantograph 12. An application component 84 incorporates the variable data pantograph 12 into the image data 76 to form binary image data for rendering on a marking device or "printer" 86.

Reception component 78, generation component 82, and application component 84 may be embodied in software, hardware, or both. In the exemplary embodiment, these are software components comprising processing instructions stored in memory, such as memory 72 or a separate memory, and which are executed by an associated processor 88. Components 78, 82, and 84, as well as memory 72 and processor 88, each may be local to the printing apparatus, as shown, or remote therefrom.

In the illustrated embodiment, the processor 88 is resident in the printer's digital front end, or DFE. A primary image 76 may be received as input data to the processor 88 as is normal. For example, the image 76 may be transferred from a remote workstation 90 or input from an image data storage medium, such as a floppy disk, flexible disk, hard disk, magnetic tape, or any other magnetic storage medium, CD-ROM, DVD, or any other optical medium, a RAM, a PROM, an EPROM, a FLASH-EPROM, or other memory chip or cartridge. The primary image data 76 may include image data for one or more color channels, e.g., in a portable document format. During processing, the primary image data 76 may be stored in memory 72, which is accessible to the processor 88.

A printing apparatus, as used herein can include any device for rendering a dynamically variable image on print media, such as a laser printer or a multifunction machine having copying and/or faxing as well as printing capability. "Print media" can be a physical sheet of paper, plastic, or other suitable physical print media substrate for images. The original document 50 can be a single sheet or set of related sheets generated from electronic document page images, from a particular user, or otherwise related, and the exemplary digital pantograph. An image generally may include information in electronic form which is to be rendered on the print media by the printer and may include text, graphics, pictures, and the like. The operation of applying images to print media, for example, graphics, text, photographs, etc., is generally referred to herein as printing or marking. While in the exemplary embodiment, the printing apparatus 70 is described in terms of a xerographic printer, it is also contemplated that the printer may incorporate inkjet or other marking technology.

Information 80 may accompany the image 76 in the form of a job ticket, which provides the instructions for generating the variable data pantograph 12. Alternatively, at least some of the instructions 80 may be embedded in the image 76, for example, using HTML or XML tags. The instructions 80 may include parameters of a variable data string to be incorporated, such as one or more of the letters or other characters which are to make up the variable data pantograph, the order in which they are to appear in the string, the location(s) of the variable data pantograph 12 with respect to the primary image 76, or repetition pattern or other arrangement of the variable data string on the page, as well as the color(s) to be used in rendering the variable data string. Alternatively, one or more of the parameters of the variable data pantograph 12 may be selected at the printing apparatus 70 or be stored in memory 72 at the printing apparatus or be received in a file along with the incoming primary image data.

In one embodiment, the generation component 82 generates the variable data pantograph based on the source 90 of the information, such as the name of the workstation user. For example, the generation component 82 may configure the variable data string in the general form "printed by X" where X is the name of the workstation user, which is provided by information 80.

In another embodiment, a user selection device 92, in communication with the processor 88 allows a user to provide information 80. The exemplary user selection device 92 includes a screen 94, which displays a graphical user interface, and an associated input device 96, such as a keyboard, keypad, touch screen, and/or cursor control device, which allows a user to select characters to form variable data strings, for example, by typing a text string on the keyboard 96. For example, the user may type the variable data string "No copying without authorization of Jane Doe," which is to be used to form the variable data pantograph 12. In one embodiment, the user can view a representation of the variable data pantograph 12, superimposed on the image 76, on the screen 94. The representation of the pantograph may illustrate the cancelled term which will appear when the document is copied, rather than replicating the variable data pantograph exactly. The user can then determine whether the variable data pantograph is properly located, with respect to the image 76. In one embodiment, the user can change parameters, such as the pantograph's location, size, repetition frequency, color, or the like via the input device 96. As will be appreciated, each of these operations may alternatively take place at a location remote from the printer, such as at the workstation 90. In one embodiment, a user interface similar to that disclosed in U.S. Pub. No. 20060127117, published Jun. 15, 2006, entitled USER INTERFACE FOR DIFFERENTIAL GLOSS IMAGES, by Reiner Eschbach, et al., may be employed as the user selection device 92. The user is instructed to indicate the base primary image data, and the characters forming the desired variable data pantograph 12. This data may be displayed for verification and position adjustment by superimposition of the representation of the variable data pantograph upon the base image data.

In combining the variable data 12 with the image data 76, a single color may be selected for the variable data, which is different from the rest of the image. Or, where a particular color separation is used for both the image data 76 and the pantograph 12, the image data may take precedence over the pantograph 12, or vice versa.

In one embodiment, the image data 98 thus formed which includes the variable data pantograph 12 and optionally image 76, such as text, graphics, or the like, may be stored as a digital image data file to be rendered by the same or a different printer or marking device from the printing apparatus creating the digital image file. For example, the image data file may be stored for later rendering on a printer which does not have software and/or hardware for embedding variable data pantographs in images.

Figure 9:
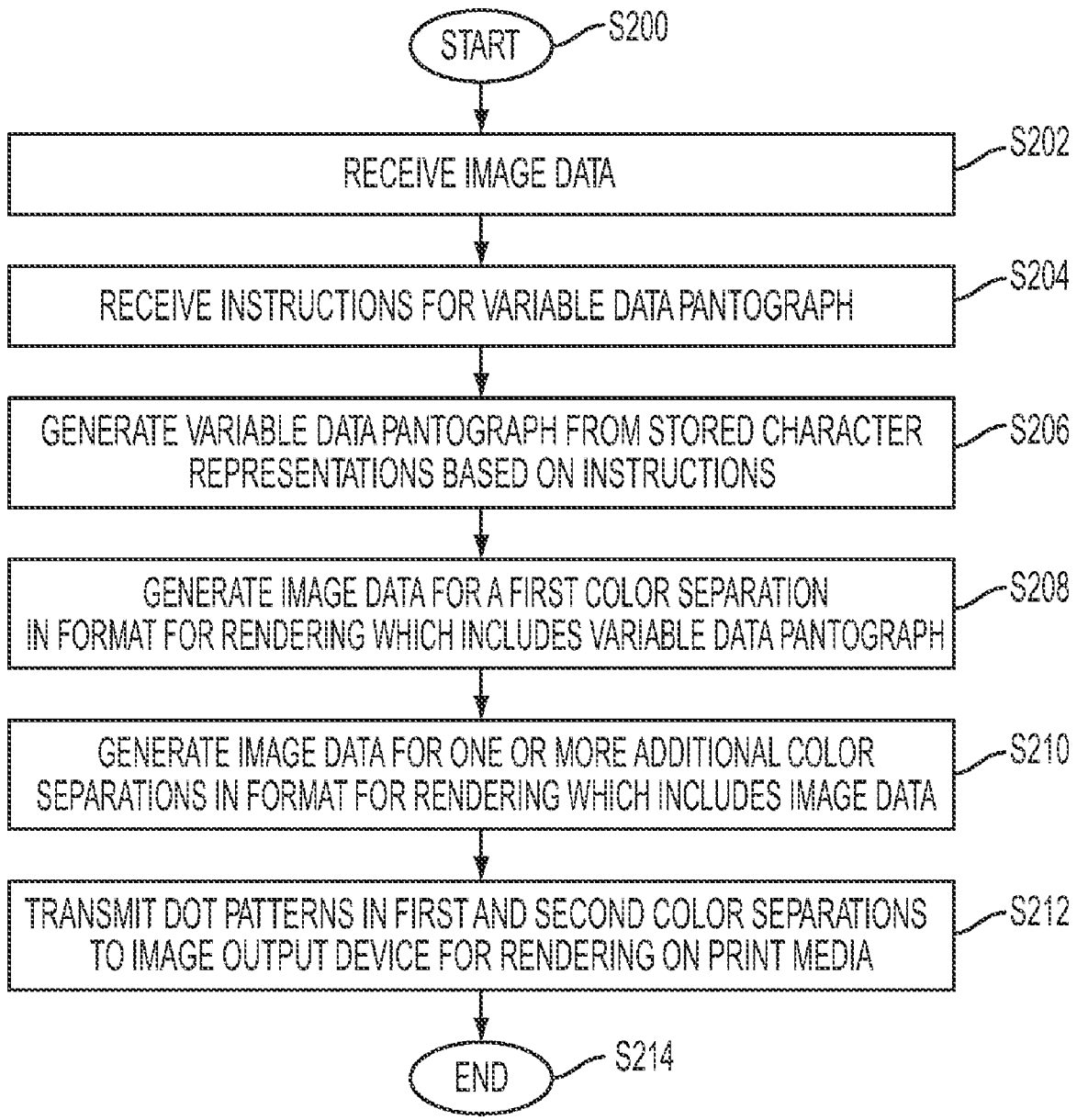
FIG. 9 illustrates a method for incorporating a variable data pantograph in an original document, in accordance with a third aspect of the exemplary embodiment.

The exemplary processor 88 executes instructions 78, 82, 84, stored in memory for performing the method outlined in FIG. 9. The processor 88 may be embodied as hardware, software or both and may be hosted by any suitable computing device, such as a PC, such as a desktop, a laptop, palmtop computer, portable digital assistant (PDA), cellular telephone, pager, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. Components of the apparatus may communicate via a data control bus 100.

The memory 72 may represent any type of computer readable medium such as random access memory (RAM), read only memory (ROM), magnetic disk or tape, optical disk, flash memory, or holographic memory. In one embodiment, the memory 72 comprises a combination of random access memory and read only memory. In some embodiments, the processor 88 and memory 72 may be combined in a single chip. In one embodiment, memory 72 stores instructions executed by the processor 88 for performing the exemplary method as well as the vocabulary 74 and processed image data 98.

While particular reference is made to electrophotographic (e.g., xerographic) printers, suitable printers 86 may also include ink-jet printers, including solid ink printers, thermal head printers that are used in conjunction with heat sensitive paper, and other devices capable of marking an image on a substrate. In some embodiments, printer 86 includes a plurality of marking devices, such that a first marking device may apply a first color separation (such as for applying the variable data pantograph 12) and a second marking device may apply a color separation (e.g., for applying the image 76).

FIG. 9 illustrates an exemplary method for creating an original document 50 incorporating a variable data pantograph 12 in accordance with the exemplary embodiment. It should be appreciated that the method may include fewer, more or different steps and that the steps of the exemplary method need not be performed in the order shown. The method assumes that a set of character representations 10A, 10B, etc. have been generated for the entire vocabulary 74, e.g., by the method of FIG. 3, and stored in memory 72. In general, these preliminary steps are performed prior to receiving a request to generate an original document 50 and thus once performed do not need to be repeated for each original document 50 to be created. In other embodiments, however, they may be performed later.

The method begins at S200. At S202, an input image to be rendered is input to the processor 88. For example, a digital image file which includes one or more digital images, such as image 76, is received by the printing apparatus 70, e.g., in the form of a print job. The file may be received via a network, e.g., from the networked computer 90 or input from an image data storage medium, such as a floppy disk, flexible disk, hard disk, magnetic tape, or any other magnetic storage medium, CD-ROM, DVD, or any other optical medium, a RAM, a PROM, an EPROM, a FLASH-EPROM, or other memory chip or cartridge. Alternatively, the file may be input to a computing device separate from the printer, on which the processor 88 is located, or retrieved from an image data storage device by that computing device.

At S204, information 80 for generating a variable data pantograph 12 is input. For example, instructions 80 are received by reception component 78. The instructions may include a data string, such as a group of characters, which is to be incorporated into the image as a variable data pantograph, together with a selected font representation, where more than one font representation is available or provide other information from which a variable data string is identified.

At S206, character representations 10 are retrieved from memory 72 in accordance with the information 80 and assembled to form a variable data pantograph 12.

At S208, a binary image is generated for the color separation to be used for the variable data pantograph, together with any image data selected for that color separation.

At S210, color binary image(s) for other color separation(s) to be used for the image data are generated. At the end of step S210, the entire image 98 (image data 76 and pantograph 12) has been processed in a suitable format for rendering, e.g., as halftone dots.

At step S212, the halftoned or otherwise processed image 98 incorporating the embedded variable data pantograph 12 and primary image data 76 is submitted to the output device 86, where it is printed (e.g., with inks, toners or other marking material) on a blank print media substrate 52 to form an original image document 50. The method ends at S214.

As will be appreciated, the above method is appropriate for character representations 10 in which the sizes and periodicities of the elements 20, 24 are already incorporated into the character representations. Where the character representations are stored in other formats in which the regions are simply designated a type of element whose exact characteristics (e.g., size, periodicity, and/or locations), are determined later, the method may include additional steps, to populate these regions with elements. For example, first and second halftone screens may be provided, a respective screen being used for each of the regions 14, 16. The first and second screens may have different screen frequencies, but may otherwise be identical. A binary image may thus be generated for the color separation to be used for the variable data pantograph by toggling between first and second screens in accordance with the foreground and background regions.

The computer implemented steps of the method illustrated in FIGS. 2 and/or 9 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary methods disclosed herein may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2 and/or 9, can be used to implement the methods for creation of character representations 10 and for embedding variable data pantographs 12 in an original document.

In experiments comparing the digitally generated variable pantographs with those formed by preprinting paper with a predetermined analog pantograph which is used for applying an image thereto, the digitally created variable pantograph performed well.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of forming a variable data pantograph comprising:
    receiving a variable data string;
    retrieving at least one character representation from a vocabulary of character representations stored in memory, the retrieved at least one character representation corresponding to the variable data string, each of the character representations in the vocabulary including a foreground region including a character shape and a background region suitably sized and arranged for encompassing the foreground region, the background region incorporating a first pattern of elements and the foreground region incorporating a second pattern of elements;
    assembling the retrieved at least one character representation to form a variable data pantograph, whereby when the variable data pantograph is rendered in an original document, the foreground and background regions are similar in tone, the foreground and background regions being substantially less similar in tone in a copy of the original document to render the character visible.

2. The method of claim 1, wherein the first pattern of elements includes elements of a first size and a first frequency and the second pattern of elements includes elements of a second size and a second frequency.

3. The method of claim 2, wherein elements of one of the first size and the second size are sufficiently small such that, when in an original document incorporating the character representation, they are not reproduced by a color copier at a particular copier setting while elements of the other of the first size and the second size are sufficiently large such that they are reproduced by the color copier at the particular copier setting.

4. The method of claim 1, further comprising generating a set of character representations to comprise the vocabulary and storing the character representations in memory.

5. The method of claim 4, wherein the generating comprises, for each character representation:
    rasterizing a font character to define a pixel grid of on and off pixels;
    applying a first base pattern to on pixels in the grid; and
    applying a second base pattern to off pixels in the grid, one of the first and second base patterns comprising a first element of a first size and the other of the first and second base patterns comprising a plurality of second elements smaller in size than the first element.

6. The method of claim 5, further comprising reducing a resolution of the font character prior to rasterizing the font character.

7. The method of claim 1, further comprising, receiving image data, and incorporating the variable data pantograph into an image to be rendered based on the image data.

8. The method of claim 7, further comprising tiling the variable data pantograph across the image to be rendered.

9. The method of claim 7, further comprising assigning a first color separation to the variable data pantograph and assigning a second color separation to the image data different from the first color separation.

10. The method of claim 1, wherein the variable data string comprises characters selected from a set of characters and wherein the vocabulary comprises character representations of each of the set of characters.

11. The method of claim 1, wherein the variable data string comprises at least one ASCII character and wherein the vocabulary includes character representations of a set of ASCII characters.

12. The method of claim 1, wherein the retrieving comprises retrieving a plurality of character representations, each of the character representations having a width proportional to a frequency of the elements whereby when the variable data pantograph is rendered in the original document, the first pattern of elements extends seamlessly from the background region of one of the character representations to the background region of an adjacent one of the character representations.

13. A method of generating a font representation comprising:
receiving a set of characters to be represented in the font representation;
for each of the characters:
rasterizing the character at a reduced resolution to form a grid in which each location in the grid is designated as ON or OFF;
for each ON location, assigning a first base pattern comprising a first element;
for each OFF location, assigning a second base pattern comprising a second element; and
storing the character representation in memory, a set of the stored character representations forming the font representation;
the first and second base patterns being selected to provide regions of similar tone when rendered in an original document, which regions being substantially less similar in tone in a copy of the original document to render the character visible.

14. The method of claim 13, further comprising reducing a resolution of the font character prior to rasterizing the font character.

15. The method of claim 13, wherein the first base pattern and the second base pattern each comprise elements and wherein the first base pattern and the second base pattern differ in at least one of:
size of elements;
number of elements per pattern;
spacing of elements; and
shape of elements.

16. The method of claim 13, wherein the first base pattern and the second base pattern are of the same size and shape.

17. A printing apparatus for generating a variable data pantograph comprising a processor which executes instructions, stored in memory, for performing the method of claim 1 and an output device, which renders the original document, in communication with the processor.

18. An apparatus for generating a variable data pantograph comprising:
a reception component which receives a variable data string;
memory which stores a vocabulary of character representations, each of the character representations in the vocabulary including a foreground region including a font body image shape and a background region suitably sized and arranged for encompassing the foreground region;
a generation component which retrieves a selected at least one of the character representations from the vocabulary which are to form a variable data pantograph corresponding to the received variable data string; and
optionally, an applying component which applies the variable data pantograph to an input image, whereby when the variable data pantograph is rendered in an original document, the foreground and background regions are similar in tone, the foreground and background regions being substantially less similar in tone in a copy of the original document to render the character visible.

19. The apparatus of claim 18, further comprising an output device which renders the variable data pantograph on print media to form the original document.

20. The apparatus of claim 18, wherein the application component positions the variable data pantograph relative to received image data of the input image.

21. An electronically stored vocabulary of character representations residing in memory for use in a printing system, each of the stored character representations comprising:
a foreground region having a character shape; and
a background region suitably sized and arranged for encompassing the character shape, a first pattern of elements being incorporated into the character representation to define the foreground region and a second pattern of elements being incorporated into the character representation to define the background, whereby when the character representation is incorporated in a variable data pantograph which is rendered in an original document, the foreground and background regions are similar in tone, the foreground and background regions being substantially less similar in tone in a copy of the original document to render the character visible.

22. The electronically stored vocabulary of claim 21, wherein the first pattern and the second pattern have at least one of the same grayscale value and the same color.

23. The electronically stored vocabulary of claim 21, wherein the elements of the first pattern and the second pattern differ in both size and frequency.

24. A printing system apparatus having electronically stored in memory thereupon the vocabulary of claim 21, whereby selected ones of the character representations are retrievable and arrangeable in a selected order to form a variable data pantograph to be incorporated into an image.

* * * * *